United States Patent [19]
Lewis

[11] 3,787,650
[45] Jan. 22, 1974

[54] WATER DETECTION DEVICE FOR FUEL LINE

[76] Inventor: Warren J. Lewis, 132 Britannia, Meriden, Conn. 06450

[22] Filed: Sept. 21, 1972

[21] Appl. No.: 291,073

[52] U.S. Cl............ 200/61.04, 137/67, 200/82 C, 340/235
[51] Int. Cl...................... H01h 35/38, H01h 35/00
[58] Field of Search. 200/61.04, 61.08, 61.06, 82 R, 200/82 C, 84 B, 84 R, 83 J, 83 R; 340/235, 229; 116/114 AB, 118 A; 137/67, 68; 337/407

[56] References Cited
UNITED STATES PATENTS

| | | | |
|---|---|---|---|
| 2,263,840 | 11/1941 | Franck | 116/114 AB |
| 3,209,732 | 10/1965 | Laken | 137/67 X |
| 3,046,369 | 7/1962 | Hicks | 200/83 R |
| 3,472,253 | 10/1969 | Herscher et al. | 137/67 |
| 3,531,604 | 9/1970 | Imburgia | 200/61.04 |
| 2,781,769 | 2/1957 | Reiter | 337/407 X |
| 3,014,206 | 12/1961 | Slavin | 340/229 |
| 2,944,125 | 7/1960 | Oliveau | 200/82 C |

OTHER PUBLICATIONS

Product Engineering, 6/1951; "Your Next Switch Selection Problem" by Riche; pp. 3&4.

*Primary Examiner*—Herman J. Hohauser
*Assistant Examiner*—Robert A. Vanderhye

[57] ABSTRACT

A warning mechanism is used to indicate the presence of an impurity in a tube carrying a fluid, for example, to warn of water in a hydrocarbon fuel line. The mechanism includes a thin plastic disk which is insoluble in the fluid but soluble in the impurity, a chamber filled by the mixture after partial dissolving of the disk, and a pressure responsive transducer.

3 Claims, 5 Drawing Figures

PATENTED JAN 22 1974 3,787,650

WATER DETECTION DEVICE FOR FUEL LINE

BACKGROUND OF THE INVENTION

The present invention relates to warning devices and more particularly to such devices which indicate the presence of water in a fuel line.

The presence of water in a fuel line may cause, in the case of a gasoline internal combustion engine, freezing of the line or the carburetor, or even failure of the engine. The problem may be particularly serious in light planes or in trucks or automobiles in the winter.

It has been suggested that a warning device to detect the presence of water would consist of a water absorbent material whose resistivity would change upon absorption of water. It has also been suggested that two electrical conductors be separated by a water soluble material which, upon dissolving, permits the conductors to touch. Both of these devices, however, present a danger of explosion because of using bare electrical contacts in the presence of a hydrocarbon, such as gasoline.

It is consequently the objective of the present invention to provide a warning device to detect and indicate the presence of an impurity in a flow of fluid, which device has the following beneficial characteristics:

1. the device will be safe and not present a danger of explosion and specifically will not use bare electrical conductors in the hydrocarbon stream;
2. the device will give a positive indication, such as a noise or light, of the presence of the water and will not use an analog gauge, which may give indistinct or ambiguous results;
3. the device will permit a relatively convenient and inexpensive re-setting so that it will be ready to be re-used;
4. the device will be relatively simple and sturdy in construction to prevent false indications and yet be relatively low in cost.

Other objectives of the present invention will be apparent from the following detailed description of the inventor's best mode of practicing the invention, the written description being taken in conjunction with the accompanying drawings.

SUMMARY OF THE INVENTION

The warning device of the present invention consists of an instrument which may be attached to existing fuel lines or alternatively may be installed along with the installation of new fuel lines, for example, in automobiles, boats, or planes, or other equipment using a flow of a hydrocarbon. In general, the device consists of a tubular body having external screw threads for mounting in or near a fuel line. The bottom of the tubular body is sealed by a removable disk held between washers. This disk is of a plastic resin film which is insoluble in the hydrocarbon and soluble in water. A pressure actuated explosion proof electrical switch is positioned near the top of the tubular body. The switch operates a warning device, such as a light or buzzer, or operates a shut-off switch.

In one embodiment, when water dissolves the disk, the water-hydrocarbon mixture enters the chamber with the tubular body and, by its own pressure, pushes against a piston and actuates the pressure switch. In another embodiment the entering mixture lifts a float which actuates the switch. In still another embodiment, when the water dissolves the film, air or vacuum is drawn into the chamber from a vacuum or air line attached to the tubular body, which vacuum or air actuates the pressure switch.

BRIEF DESCRIPTION OF THE DRAWINGS

In the drawings which accompany this application and which should be taken in conjunction with the following detailed description, the figures are as follows.

DESCRIPTION OF THE PREFERRED EMBODIMENTS

Figure 2:
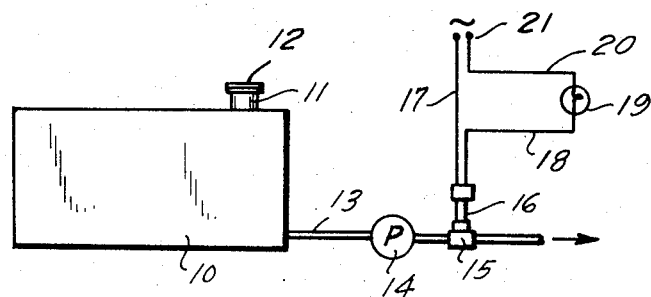
FIG. 2 is a side plan view illustrating the position of the valve in a fuel line and indicating the warning system.

The overall system of the present invention is illustrated in connection with FIG. 2. As shown in FIG. 2, a fuel tank 10 has an opening 11 which is closed by a cap 12. For example, the fuel tank may be the gasoline tank of an automobile, tractor, boat, or other vehicle. A fuel line 13 leads from the fuel tank 10 to one side of a pressure pump 14 and out of the other side of the pump. A "T" pipe coupling 15 attaches the warning device, which is the warning device of the present invention, to the fuel line 13.

Two insulated electrical wires lead from the warning device 16, one of the wires 17 leading to a power source and the other wire 18 leading to one side of the lamp 19, which is the warning indicator. The other side of the lamp 19 is connected by wire 20 to the power source 21. It will be understood, however, that other types of warning indicators, for example, buzzers, may be used in place of the lamp 19 illustrated in FIG. 2, or a shut-off switch or relay may be used instead of, or in addition to, the warning indicator.

Figure 1:
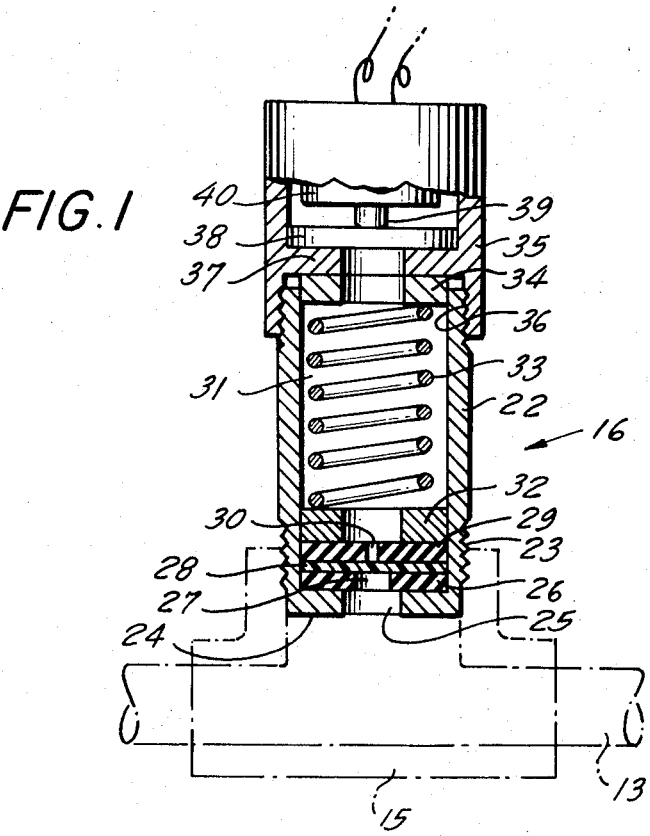
FIG. 1 is a side plan view, taken partly in cross-section, showing the position of the warning device mounted in a fuel line, with the mounting and fuel line being shown in dash-dot lines. The warning device is the first embodiment of the present invention and is of the spring-pressure type.

The warning device 16 is shown in greater detail in FIG. 1. It consists of a cylindrical tubular body member 22 having bottom exterior screw threads 23 which screw into one arm of the "T" connection 15. The bottom of the tubular body is partly closed by an integral internal circular flange (lip) 24, forming a round hole opening 25. A first washer 26 is positioned on the inside of the flange lip 24, the washer 26 having a central hole 27. A disk 28, of a plastic resin film, is positioned on the top of the washer 26. The disk 28 is backed by a second washer 29 having therethrough a central hole 30, which hole 30 is smaller in diameter than the hole 27 of the washer 26. The washers 26 and 29 are of a material which is insoluble in both water and the hydrocarbon fuel and is preferably of neoprene rubber. The disk 28 is preferably of poly-vinyl-alcohol film (P.V.A.)

which is water soluble, insoluble in hydrocarbons, and may be plasticized with glycerine. That P.V.A. film is available from Polyval Corp., New York City, or Cadillac Plastic & Chemical Co., Detroit, Michigan.

It will be understood that the dimensions set forth below are not critical to the proper functioning of the device and the dimensions will depend upon the size of the tubular body as well as the amount of water which is desired to set off the warning. However, the dimensions set forth below have been found suitable for inclusion in a warning device utilized in connection with the automobile fuel line, the automobile having a gasoline internal combustion engine. The tubular body has a one-half inch internal diameter forming its chamber 31. The neoprene gaskets 26 and 29 are each 1/16 of an inch thick and ½ inch in diameter. The hole 25 is ¼ of an inch in diameter, the hole 27 is 1/8 of an inch in diameter, and the hole 30 is 0.025 inch in diameter. The plastic disk is 0.008 inch thick and ½ inch in diameter. A brass washer 32 is positioned on top of the washer 29, the brass washer being ⅛ of an inch thick and ½ inch in diameter. A steel spring 33, preferably ⅜ of an inch in diameter and of 60 pounds strength, is positioned between the brass washer 32 and a second brass washer 34 which is at the top of the tubular body 22, the second brass washer also having a thickness of ⅛ of an inch and a diameter of ½ inch.

A tubular top member 35 has internal screw threads 36 which screw onto the external screw threads at the top of the body member 22. An internal flange 37, integral with the top member 35, holds down the brass washer 34. A slidable piston 38 is positioned in the top cavity of the top member 35 and slidable in a vertical direction therein. The piston 38 acts upon button 39 of the pressure responsive switch (transducer) 40 which is fixed to top member 35. A suitable switch is an explosion-proof micro-switch which is normally open, set for a pressure of 3–5 lbs. per square inch, and is closed by upward pressure on button 39.

It has been found preferable to position the warning device in the pressure side of the fuel line and close to the pump. The pressure required to activate the switch and the working time may be changed by varying the sizes of the holes in the neoprene washers and the thickness of the film.

In operation, if water in the fuel comes in contact with the film it will dissolve and rupture the film. The water-fuel mixture, which is under pressure, will enter the chamber through the orifices of the body member and the washers and will push the piston upwards, thereby closing the switch contacts.

Figure 3:
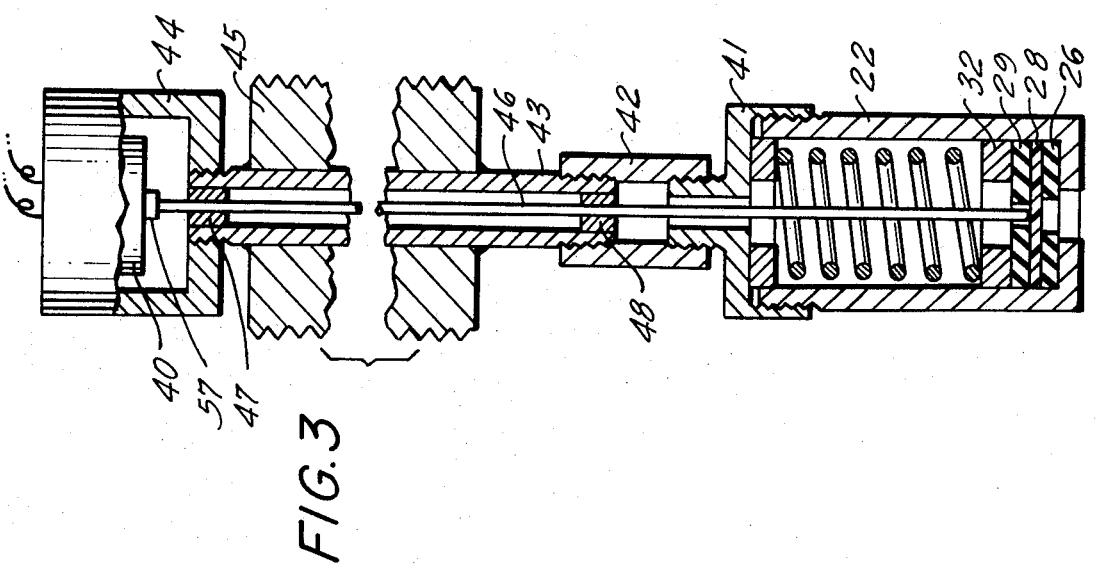
FIG. 3 is a side plan view, shown mostly in cross-section, of the second embodiment of the present invention which is also of the spring-pressure type.

In the embodiment of FIG. 3 the body member 22 is screw-connected to a cap 41. A first short rigid tube 42 connects with elongated rigid tube 43 which connects with the top member 44 containing the switch 40. A support 45 is attached to tube 43 and has external screw threads to install it in a tank or fuel unit. An elongated plunger 46 is connected to the pressure switch 40 and its shaft is guided by rings 47 and 48. When the film is ruptured by the water-fuel mixture, the bottom of the plunger 46 will descend through the film 28, causing button 57 to move downward and closing the switch contacts of switch 40. In this embodiment the switch is closed by downward motion of its button.

Figure 4:
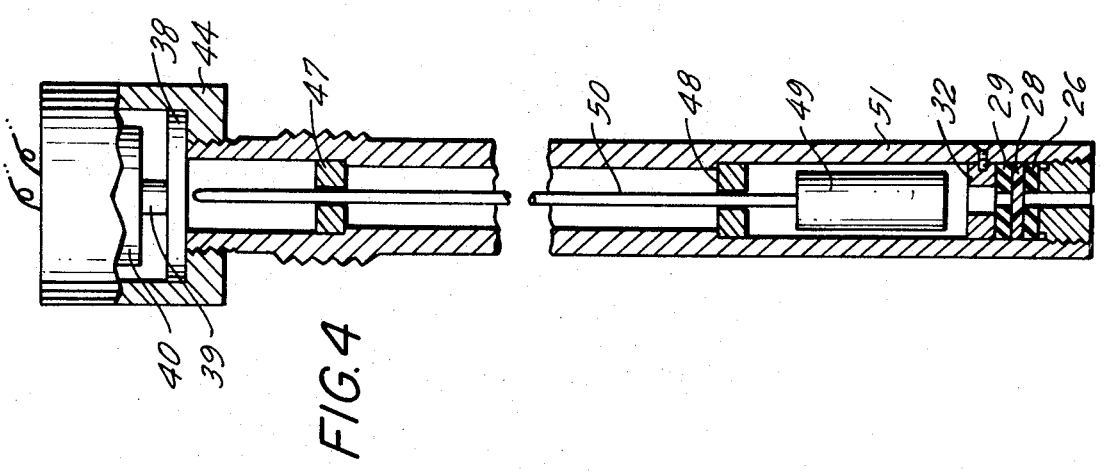
FIG. 4 is a side plan view, shown mostly in cross-section, of the third embodiment of the present invention which is of the non-pressure float type.

In the embodiment of FIG. 4 a float 49 is fixed at the end of a shaft 50. The shaft 50 is movably guided by rings 47 and 48. The rigid elongated tubular member 51 at its lower end contains the washers and film described above and tubular member 51 is attached to top member 44. A disk 38 is slidable within the chamber of top member 44. When the film 28 is ruptured the entering liquid will cause a floatation of float 49, pushing the shaft 50 upwards against the disk 38, which will push upward on buttom 39, causing the contacts of switch 40 to close.

Figure 5:
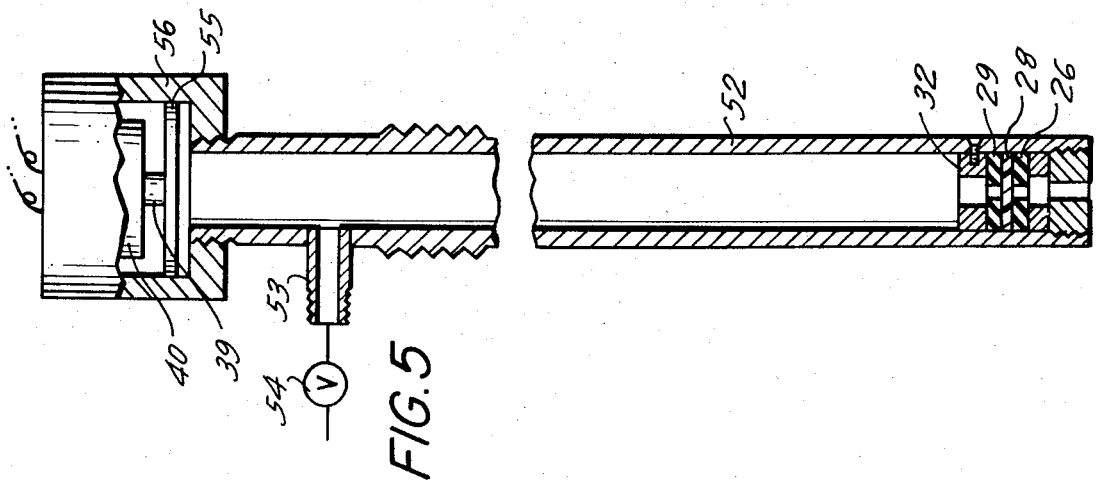
FIG. 5 is a side plan view, shown mostly in cross-section, showing the fifth embodiment of the present invention, which is of the vacuum or air pressure type.

In the embodiment of FIG. 5 the body member is an elongated rigid tube 52. Another tube 53 is in communication with it and fastened thereto. The tube 53, through one-way valve 54, is in communication with a source of air pressure or, alternatively, as a source of vacuum. A piston 55 is slidably positioned in the chamber of top member 56.

What is claimed is:

1. A warning device to detect the presence of an impurity in a liquid, comprising a body member adapted to be mounted on a container or line for the fluid, said body member having an internal chamber, said body member having an orifice into said chamber, a film sealing said orifice, said film being insoluble in said fluid and soluble by said impurity, said film sealing said fluid from said chamber after mounting of said body member, and a pressue actuated electrical switch attached to said body member and positioned so that flow of fluid through said orifice will actuate said switch and wherein said body portion is cylindrical and has a bottom internal flange forming a lip, a first washer mounted on said flange within said chamber, said film being positioned on said washer, a second washer positioned on said film, and a spring compressed against said second washer.

2. A warning device as in claim 1 wherein the holes of the washers are aligned with the hole formed by said flange, and the hole of said first washer is larger in diameter than the hole of said second washer.

3. A warning device as in claim 1 wherein said washers are flexible and resilient and insoluble in said liquid or said impurity.

* * * * *